INVENTOR
Peter J. Slater
BY S. Jay Teller
ATTORNEY

Patented May 3, 1949

2,469,181

UNITED STATES PATENT OFFICE 2,469,181

POWER ATTACHMENT FOR TRACTORS

Peter J. Slater, East Hartford, Conn., assignor to The South Windsor Manufacturing Company, South Windsor, Conn., a corporation of Connecticut Application June 14, 1947, Serial No. 754,627

4 Claims. (Cl. 74—15.6)

1

The invention relates to an attachment adapted for use with a tractor or other machine having an exposed power take-off shaft which projects rearward or outward. The general object of the invention is to provide an attachment which can be readily mounted on the tractor or other machine so as to transmit power from the take-off shaft to a suitable power driven device mounted on the attachment. The power driven device may be an air compressor, or a water pump, or any other small device requiring power.

An attachment embodying the invention is particularly adapted for use with a tractor having not only a rearward projecting power take-off shaft but also having a guard partly surrounding the take-off shaft. In most tractors the projecting take-off shaft and the guard therefor conform to a standardized design, and the attachment embodying the invention is so constructed as to utilize the standard guard for partly supporting the attachment and for holding it in place.

In the drawing I have shown in detail a preferred embodiment of the invention, but it will be understood that various changes may be made from the construction shown, and that the drawing is not to be construed as defining or limiting the scope of the invention, the claims forming a part of this specification being relied upon for that purpose.

Figure 1:
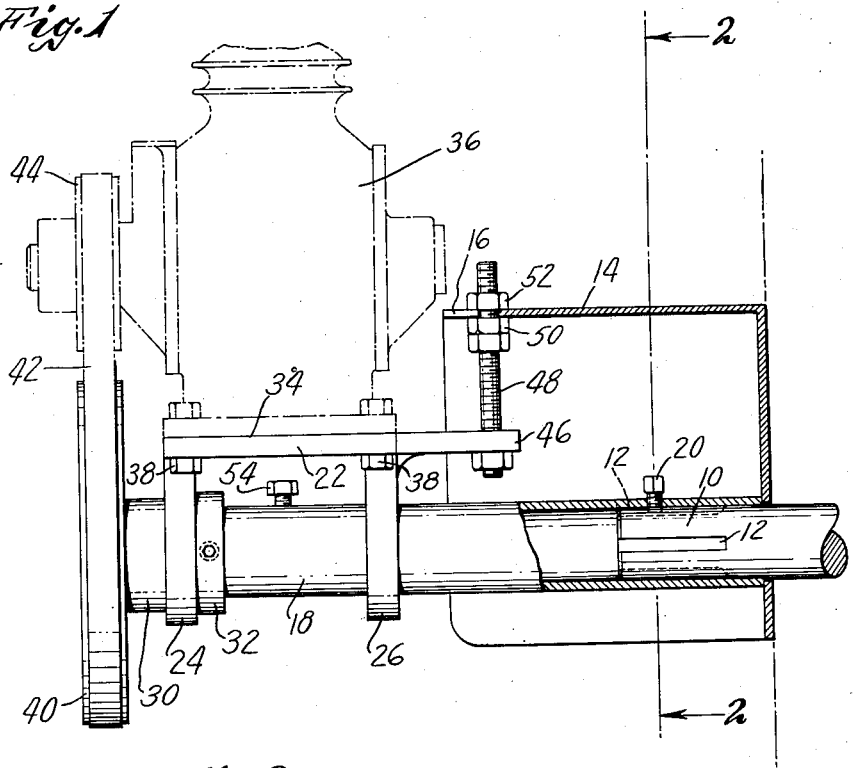
Fig. 1 is a side view of an attachment embodying the invention, the attachment being shown in place on a tractor with the guard around the take-off shaft shown in longitudinal section.
Figure 2:
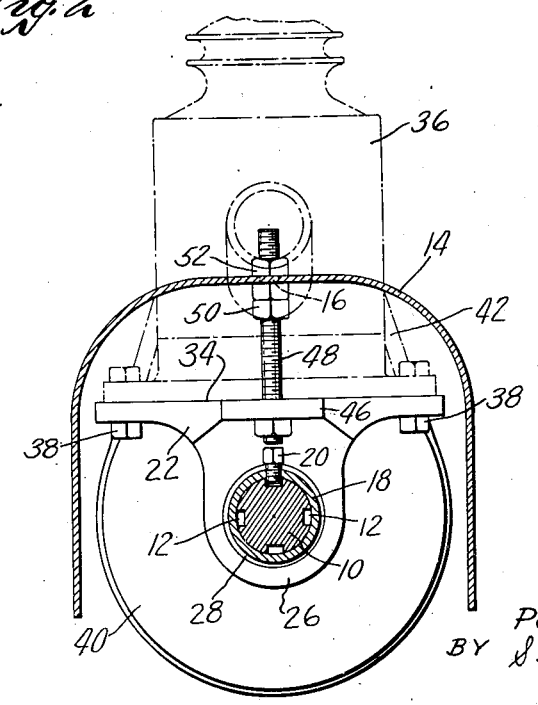
Fig. 2 is a transverse sectional view taken along the line 2—2 of Fig. 1.

Referring to the drawing, 10 represents the take-off shaft of a tractor, this shaft projecting toward the rear and being provided with one or more splines 12, 12. Ordinarily, the projecting end of the shaft 10 is partly covered or surrounded by a guard 14 which is open at the rear. As shown, the guard 14 has the cross-sectional shape of an inverted U. Formed in the guard 14, preferably at the top, is a narrow slot 16 which is open at the rear.

Manufacturers of tractors have adopted a standardized design for the projecting end of the shaft 10 and for the guard 14, the shafts and guards of most tractors conforming to this standardized design. While the design is generally standardized, two sizes of shafts are produced and the drawing shows the larger of the two sizes. An attachment embodying the invention, while not necessarily so limited, is particularly adapted for use with tractors having standardized take-off shafts and guards.

The attachment includes a longitudinal transmission shaft 18 which is preferably hollow, the shaft being of such size that the front end portion thereof can fit the rearward projecting portion of the power take-off shaft 10. The transmission shaft 18 is provided with a suitable means such as a set screw 20 for entering one of the splines 12, 12 to insure rotation of the shaft 18 in unison with the take-off shaft 10. Ordinarily, the set screw 20 is so adjusted that it is not seated against the bottom of the spline in which it is entered. This permits the shaft 18 to be freely withdrawn rearward.

If the take-off shaft 10 is smaller than that shown in the drawing, a bushing (not shown) may be provided within the hollow shaft 18, this bushing being of such size that it fits within the shaft 18 and around the smaller shaft 10.

A bracket 22 is provided having a platform 34 from which depend flanges 24 and 26 provided with bearing bushings such as 28 in which the rear portion of the shaft 18 is rotatable. The shaft 18 is provided with a collar 30 which is adjacent one side of one of the flanges, as for instance the flange 24, and the said shaft is also provided with another collar 32 adjacent the other side of the flange. These collars prevent endwise movement of the shaft with respect to the bracket.

The platform 34 is adapted for the mounting of a suitable power driven device. As already stated, this power driven device may be an air compressor or a water pump, or any other small device requiring power. By way of example, an air compressor 36 is shown, but the invention is not limited to any particular device. The platform 34 for carrying the power driven device is preferably parallel with and closely adjacent the shaft 18 and is preferably positioned horizontally at the top thereof. When the shaft 18 is connected with the take-off shaft 10 the platform 34 is behind a transverse plane through the rear of the guard 14 so as to provide ample space at the rear of the guard for the power driven device such as 36. As shown, the air compressor or other power driven device is secured to the platform 34 by means of bolts 38, 38.

The shaft 18 carries a member for engagement with a suitable element adapted for transmitting power from the said shaft to the power driven device. As shown, the member on the shaft 18 is a belt pulley 40 at the rear end thereof and the power transmitting element is an endless belt 42 passing around the pulley. The power driven device 36 is provided with a belt pulley 44 around which the belt 42 passes. When the member on the shaft 18 is a pulley such as 40, the beforementioned collar 30 may be the hub of the pulley.

Inasmuch as the shaft 18 closely fits the take-off shaft 10, the said shaft 18 and also the platform and the device 36 are supported in part by the take-off shaft. A suitable means is preferably provided which serves to prevent rotation of the platform and device about the axis of the shaft and which also serves to additionally support the said platform and the said power device.

As shown, the platform is provided with a lug 46 which projects forward within the guard 14. Secured to the lug 46 is a threaded stud 48 which extends upward through the slot 16 in the guard 14. Means such as nuts 50 and 52 on the stud 48 engage the faces of the guard adjacent the slot 16 so that the stud 48 is locked in position with respect to the guard. Thus the lug 46 and the stud 48 constitute a forward projection on the platform which serves to partly support the shaft, the platform and the device, and also serves to prevent rotative movement of the platform and device about the axis of the shaft. Inasmuch as the set screw 20 does not engage the bottom of the spline in which it is entered, the entire assembly is movable rearward with respect to the take-off shaft 10. The stud 48 and the nuts 50 and 52 thereon normally prevent such rearward movement.

The bracket 22 comprising the platform 34 and the bearings thereon together with the shaft 18 and the parts immediately associated therewith can be manufactured and sold as a unit. Any suitable power driven device, such as the air compressor 36, can be mounted on the platform. The pulley 40, or other power transmitting member, can be made of such size as to insure the operation of the device at a suitable speed. The power take-off shaft is ordinarily rotated at approximately 350 R. P. M., and the power transmission means ordinarily operates the device at a higher speed.

In some instances the power operated device may be merely a power transmission unit for operating a flexible shaft connected with a mechanism to be operated. Such a power transmission unit would serve to drive the flexible shaft at a speed different from that of the take-off shaft, ordinarily at a higher speed.

The bracket 22 and the shaft 18 and the immediately associated parts may be regarded as constituting the "attachment," and the user will ordinarily have a separate attachment for each power driven device which is to be operated. The attachment will be permanently connected with the device, and the entire assembly including the device and the attachment can be readily put in place on the tractor or removed therefrom. With the nut 52 loosened, the entire assembly can be moved forward into operative position with the shaft 18 surrounding and fitting the take-off shaft 10. Then the nut 52 can be tightened to hold the entire assembly in place. The assembly is freely removable upon loosening the nut 52.

In some instances the tractor is not provided with a standardized guard such as 14, the take-off shaft merely projecting rearward without any guard around it. When the attachment is to be used with a tractor having no guard, it may be reversed in position so that the pulley 40 is at the front instead of at the rear. When the attachment is in the reversed position as described, the opposite end of the hollow shaft surrounds and fits the take-off shaft, and a separate set screw 54 is provided which can be entered in one of the splines of the take-off shaft. When the attachment is so used all of the parts are supported entirely on the take-off shaft, the stud 48 and the nuts thereon having no function. With the attachment in reverse position any suitable means such as a wire or chain may be used to prevent rotative movement of the attachment and of the device about the axis of the shaft.

What I claim is:

1. In a power attachment for a tractor having a rearward projecting power take-off shaft and having a guard partly surrounding the take-off shaft which guard extends rearward beyond the rear end of the shaft and is open at the rear, the combination of a longitudinal transmission shaft which is adapted at its front end to extend forward within the guard and which is hollow at its said front end and adapted to fit around the rear end of the take-off shaft so as to be at least partly supported by the latter, means for connecting the transmission shaft at its said front end with the take-off shaft for rotation in unison therewith, a platform positioned closely adjacent the rear portion of the transmission shaft and provided with bearings in which the said rear portion of the shaft is rotatable, the said platform being at least partly supported on the transmission shaft when the latter is connected with the take-off shaft and having a substantially flat face for supporting a power driven device and the said platform when the transmission shaft is so connected being behind a transverse plane through the rear of the guard so that a power driven device positioned on the platform is at the rear of the guard, and a member connected with the transmission shaft adjacent the platform for engaging an element adapted for transmitting power from the said shaft to a power driven device supported on the platform.

2. In a power attachment for a tractor having a rearward projecting power take-off shaft and having a guard partly surrounding the take-off shaft and extending rearward beyond the rear end of the shaft which guard is open at the rear and has a slot therein open at the rear, the combination of a longitudinal transmission shaft which is adapted at its front end to extend forward within the guard and which is hollow at its said front end and adapted to fit around the rear end of the take-off shaft so as to be at least partly supported by the latter, means for connecting the connecting shaft at its said front end with the take-off shaft for rotation in unison therewith, a platform positioned closely adjacent the rear portion of the transmission shaft and provided with bearings in which the said rear portion of the shaft is rotatable, the said platform being at least partly supported on the transmission shaft when the latter is connected with the take-off shaft and being adapted for supporting a power driven device and the said platform when the transmission shaft is so connected being behind a transverse plane through the rear of the guard so that a power driven device positioned on the platform is at the rear of the guard, a forward projection on the platform having an element positioned to enter the slot in the guard when the transmission shaft is connected as aforesaid, the last said element by its engagement with the guard serving to prevent rotative movement of the platform, and a member connected with the transmission shaft adjacent the platform for engaging an element adapted for transmitting power from the said shaft to a power driven device supported on the platform.

3. In a power attachment for a tractor having a rearward projecting power take-off shaft and having a guard partly surrounding the take-off shaft and extending rearward beyond the rear end of the shaft which guard is open at the rear and has a slot therein open at the rear, the combination of a longitudinal transmission shaft which is adapted at its front end to extend forward within the guard and which is hollow at its said front end and adapted to fit around the rear end of the take-off shaft so as to be at least partly supported by the latter, means for connecting the transmission shaft at its said front end with the take-off shaft for rotation in unison therewith, a platform positioned closely adjacent the rear portion of the transmission shaft and provided with bearings in which the said rear portion of the shaft is rotatable, the said platform being at least partly supported on the transmission shaft when the latter is connected with the take-off shaft and being adapted for supporting a power driven device and the said platform when the transmission shaft is so connected being behind a transverse plane through the rear of the guard so that a power driven device positioned on the platform is at the rear of the guard, a forward projection on the platform having a threaded element which is positioned to enter the slot in the guard when the transmission shaft is connected as aforesaid, the last said element by its engagement with the guard serving to prevent rotative movement of the platform, a nut on the threaded element engageable with the guard adjacent the slot therein and serving to rigidly connect the said element with the said guard and to thus partly support the platform, and a member connected with the transmission shaft adjacent the platform for engaging an element adapted for transmitting power from the said shaft to a power driven device supported on the platform.

4. In a power attachment for a tractor having a rearward projecting power take-off shaft, the combination of a longitudinal hollow transmission shaft which is adapted at each end to fit around the rear end of the take-off shaft so as to be at least partly supported by the latter, the hollow transmission shaft being adapted to engage the take-off shaft in either of two relatively reversed positons, means at each end of the transmission shaft for connecting it with the take-off shaft for rotation in unison therewith, a platform positioned closely adjacent one end portion of the transmission shaft and provided with bearings in which the last said end portion of the shaft is rotatable, the said platform being at least partly supported on the transmission shaft when the latter is connected at either end thereof with the take-off shaft and the said platform being adapted for supporting a power driven device, and a member connected with the transmission shaft adjacent the platform for engaging an element adapted for transmitting power from the said shaft to a power driven device supported on the platform.

PETER J. SLATER.

REFERENCES CITED

The following references are of record in the file of this patent:

UNITED STATES PATENTS

| Number | Name | Date |
|---|---|---|
| 889,437 | Callahan | June 2, 1908 |
| 1,044,423 | Ross | Nov. 12, 1912 |
| 1,316,529 | Basel | Sept. 16, 1919 |